(12) United States Patent
Konishi et al.

(10) Patent No.: US 7,663,290 B2
(45) Date of Patent: Feb. 16, 2010

(54) SENSOR

(75) Inventors: Yasuaki Konishi, Ashigarakami-gun (JP); Masao Watanabe, Ashigarakami-gun (JP); Hiroyuki Funo, Ashigarakami-gun (JP); Kiyoshi Iida, Ashigarakami-gun (JP); Ryota Mizutani, Ashigarakami-gun (JP)

(73) Assignee: Fuji Xerox Co., Ltd, Tokyo (JP)

( * ) Notice: Subject to any disclaimer, the term of this patent is extended or adjusted under 35 U.S.C. 154(b) by 263 days.

(21) Appl. No.: 11/808,345

(22) Filed: Jun. 8, 2007

(65) Prior Publication Data
US 2008/0088201 A1    Apr. 17, 2008

(30) Foreign Application Priority Data
Oct. 13, 2006    (JP)    ............................. 2006-280371

(51) Int. Cl.
*H01L 41/047*    (2006.01)
(52) U.S. Cl. ................................. 310/313 R; 310/313 D
(58) Field of Classification Search ............. 310/313 R, 310/313 A, 313 B, 313 C, 313 D, 318
See application file for complete search history.

(56) References Cited

U.S. PATENT DOCUMENTS 5,262,977 A * 11/1993 Mitsutsuka ................. 708/815

2006/0273904 A1 * 12/2006 Funo et al. ............... 340/572.1

FOREIGN PATENT DOCUMENTS

JP    A 11-504112    4/1999
JP    A 2005-159580    6/2005

* cited by examiner

*Primary Examiner*—Walter Benson
*Assistant Examiner*—Derek J Rosenau
(74) *Attorney, Agent, or Firm*—Oliff & Berridge, PLC (57) ABSTRACT

A sensor includes a substrate, a medium on which a surface acoustic wave propagates, a reference electrode, an antenna, a transducer that includes a first electrode connected to the antenna and a second electrode connected to the reference electrode and arranged opposite to the first electrode, and that has a function of converting a signal received by the antenna into a surface acoustic wave propagating on the medium, and a function of converting a surface acoustic wave propagating on the medium and reaching the transducer into a signal and outputting the signal to the antenna, a reflector that throws back a surface acoustic wave generated by the transducer, propagating on the medium, and reaching the reflector, toward the transducer, and an impedance converter connected to the reference electrode, impedance of which changes in response to a change in circumstances surrounding the sensor.

7 Claims, 7 Drawing Sheets

SENSOR

This application is based on and claims priority under 35 USC 119 from Japanese Patent Application No. 2006-280371 filed on Oct. 13, 2006.

BACKGROUND

1. Technical Field

The present invention relates to a sensor.

2. Related Art

A SAW (Surface Acoustic Wave) sensor, which uses a surface acoustic wave caused by the piezoelectric effect, is known. A SAW sensor converts a received signal into a surface acoustic wave propagating on a substrate of the SAW sensor, and again converts the surface acoustic wave, into a signal to be transmitted. A delay time of a transmitted signal depends on conditions such as a propagation distance of a surface acoustic wave or the material of a substrate of a SAW sensor, which can be affected by a change in the circumstance surrounding a SAW sensor. Therefore, measuring of a delay time of a transmitted signal makes it possible to distinguish plural SAW sensors, or to detect a change in the circumstances surrounding a SAW sensor.

SUMMARY

An aspect of the present invention provides a sensor including a substrate, a medium deposited on the substrate and on which a surface acoustic wave propagates, a reference electrode deposited on the substrate, that serves as a reference surface of potential, an antenna that receives and transmits a signal, a transducer deposited on the medium, that includes a first electrode connected to the antenna and a second electrode connected to the reference electrode and arranged opposite to the first electrode, and that has a function of converting a signal received by the antenna into a surface acoustic wave propagating on the medium, and a function of converting a surface acoustic wave propagating on the medium and reaching the transducer into a signal and outputting the signal to the antenna, a reflector that throws back a surface acoustic wave generated by the transducer, propagating on the medium, and reaching the reflector, toward the transducer, and an impedance converter connected to the reference electrode, impedance of which changes in response to a change in circumstances surrounding the sensor.

BRIEF DESCRIPTION OF THE DRAWINGS

Exemplary embodiments of the present invention will now be described in detail with reference to the following figures, wherein.

DETAILED DESCRIPTION (1) First Exemplary Embodiment

Figure 1A:
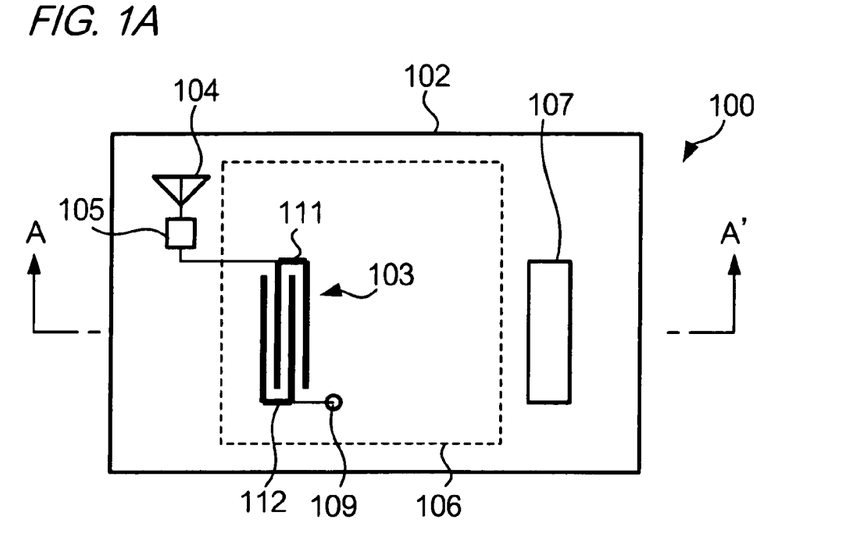
FIGS. 1A to 1C are diagrams illustrating a configuration of sensor 100.
Figure 1B:
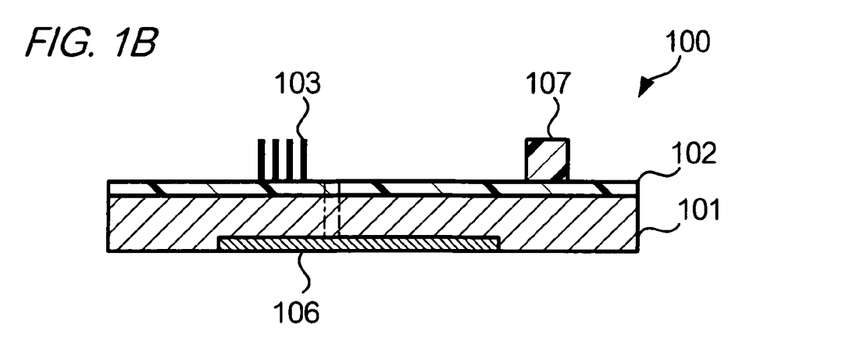
Figure 1C:
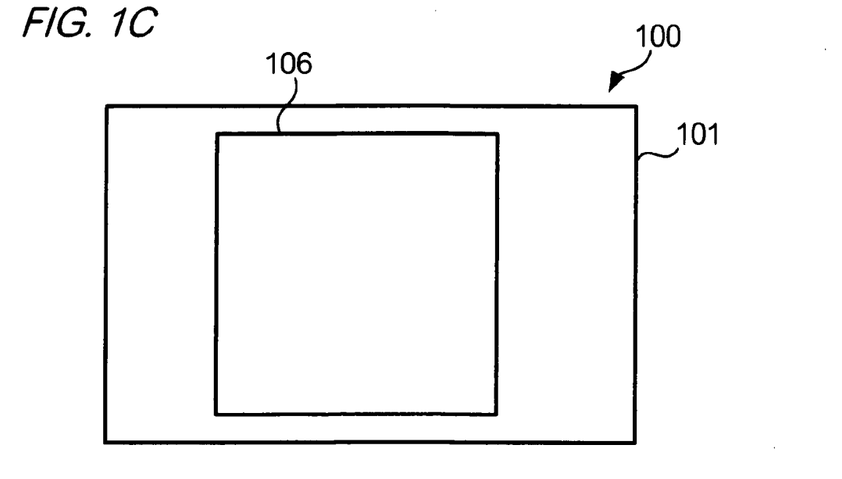

FIG. 1A is a plan view of sensor 100 according to the present exemplary embodiment. FIG. 1B is a cross-section view of sensor 100 along the line A-A' of FIG. 1A. FIG. 1C is a diagram illustrating the other side of sensor 100, or the under surface of sensor 100 shown in FIG. 1B.

As shown in FIGS. 1A and 1B, piezoelectric substance 102 is deposited on a surface of substrate 101 of sensor 100. On piezoelectric substance 102, IDT (Inter-digital Transducer) 103, antenna 104, impedance matching circuit 105, and reflector 107 are deposited. On the other side of substrate 101, reference electrode 106 is deposited as shown in FIG. 1C.

It is to be noted that antenna 104 and impedance matching circuit 105 may not be deposited on piezoelectric substance 102, but deposited on substrate 101 directly. Also, impedance matching circuit 105 may not be provided.

Piezoelectric substance 102 is made of, for example, $LiTaO_3$, and has piezoelectricity of becoming distorted when an electric field is impressed, and producing an electric field when being distorted.

IDT 103 is a transducer that has electrodes forming a comb structure. First electrodes 111 of IDT 103 have plural electrodes that extend toward second electrodes 112, and second electrodes 112 have plural electrodes that extend toward second electrodes 111, and the electrodes of the two are arranged alternately. First electrodes 111 are connected to antenna 104, and second electrodes 112 are grounded to reference electrode 106 via through-hole 109. Reference electrode 106 serves as a reference surface of potential for defining a reference potential, and a potential of second electrodes 112 is substantially equal to the reference potential.

If a voltage is provided to first electrodes 111 of IDT 103, the voltage causes a potential difference between first electrodes 111 and second electrodes 112. The potential difference produces an electric field on piezoelectric substance 102, and piezoelectric substance 102 is distorted by the piezoelectric effect.

For instance, if an electrical signal having a certain frequency and amplitude is input to first electrodes 111, a potential difference between first electrodes 111 and second electrodes 112 changes periodically according to the frequency and amplitude of the electrical signal. Strength of an electric field produced by the potential difference changes periodically according to the change in the potential difference. A distortion of piezoelectric substance 102 caused by the electric field changes periodically according to the change in the strength of the electric field. The periodic distortion gives rise to a surface acoustic wave that propagates on piezoelectric substance 102. In short, IDT 103 has a function of converting an electrical signal into a surface acoustic wave.

Conversely, if a surface acoustic wave propagating on piezoelectric substance 102 reaches IDT 103, a part of piezoelectric substance 102 on which IDT is deposited distorts periodically according to a frequency and amplitude of the surface acoustic wave. The periodical distortion of piezoelectric substance 10 produces an electric field, the strength of which changes according to the periodical distortion; The electric field causes a potential difference between first electrodes 111 and second electrodes 112 of IDT 103 that changes periodically according to the change in the strength of the electric field, and an electrical signal having a frequency and amplitude that changes according to the change in the potential difference is output from first electrodes 111. In short, IDT 103 has a function of converting a surface acoustic wave into an electrical signal.

Antenna 104 receives a radio signal from outside, and converts the radio signal into an electrical signal to be provided to first electrodes 111 of IDT 103. Also, antenna 104 converts an electrical signal provided from first electrodes 111 of IDT 103 into a radio signal, and transmits it outside.

Impedance matching circuit 105 is, for example, a planar waveguide circuit or a circuit including passive parts such as an inductor and a capacitor. Impedance matching circuit 105 matches impedance of antenna 104 and impedance of IDT 103.

Reference electrode 106 is barely formed on the under surface of substrate 101. The characteristic impedance of reference electrode 106 is preferably 0Ω, but may be a few Ω. This is because setting characteristic impedance to 0Ω requires reference electrode 106 to have an area of several tens of square centimeters, which restricts miniaturization of sensor 100.

Reflector 107 is, for example, a piece of silicon that takes a shape of a rectangular parallelepiped. When a surface acoustic wave excited by IDT 103 reaches reflector 107, reflector 107 throws back the surface acoustic wave in the reverse direction.

Now, an operation of sensor 100 will be described.

When a radio signal transmitted from an external device as an interrogation signal is received by antenna 104 of sensor 100, the interrogation signal is converted into an electrical signal by antenna 104, and provided to IDT 103. IDT 103 converts the electrical signal into a surface acoustic wave that propagates on piezoelectric substance 102 toward reflector 107. When the surface acoustic wave reaches reflector 107, reflector 107 throws back the surface acoustic wave toward IDT 103. When the reflected surface acoustic wave reaches IDT 103, IDT 103 converts the surface acoustic wave into an electrical signal, and provides the electrical signal to antenna 104. Antenna 104 converts the electrical signal into a radio signal, and transmits the radio signal as a response signal.

Figure 2:
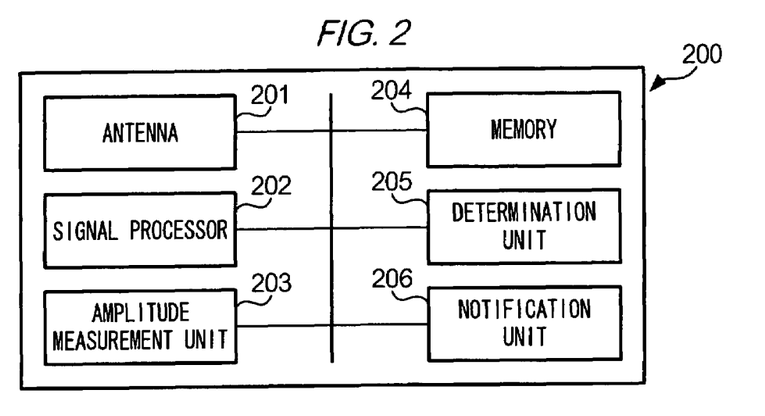
FIG. 2 is a diagram illustrating a configuration of transceiver 200.

FIG. 2 is a diagram illustrating a configuration of transceiver 200, which exchanges radio signals with sensor 100.

Signal processor 202 of transceiver 200 is a unit that generates an electrical signal having a certain frequency and amplitude, and provides the electrical signal to antenna 201. Antenna 201 is a unit that converts an electrical signal received from signal processor 202 into a radio signal, and transmits the radio signal as an interrogation signal. Also, antenna 201 receives a radio signal transmitted from antenna 104 of sensor 102 as a response signal, and converts the radio signal into an electrical signal to be provided to signal processor 202. Signal processor 202 receiving an electrical signal from antenna 201 provides the electrical signal to amplitude measurement unit 203. Amplitude measurement unit 203 is a unit that measures amplitude of an electrical signal received from signal processor 202.

Memory 204 is a nonvolatile memory that stores values specifying a certain range of amplitude of a signal. Specifically, the values are an upper limit and a lower limit of amplitude of a radio signal transmitted from antenna 104 of sensor 100 as a response signal when reference electrode 106 of sensor 100 touches a human body.

Amplitude of a response signal sent from antenna 104 of sensor 100 depends on a potential of second electrodes 112, assuming that amplitude of an electrical signal input to first electrodes 111 is constant. A potential of second electrodes 112 changes according to impedance of reference electrode 106. Accordingly, if reference electrode 106 comes into contact with a human body, which is a conductor with certain impedance, and the impedance of reference electrode 106 changes to a certain value, a potential of second electrodes 112 changes to a corresponding value. Consequently, amplitude of a response signal sent from antenna 104 of sensor 100 also changes to a corresponding value. Transceiver 200 can determine, by measuring amplitude of a response signal, whether reference electrode 106 is in contact with a human body.

It is to be noted that since a value of amplitude of a response signal varies slightly, memory 204 stores an upper limit and a lower limit that are defined on the basis of values of amplitude measured under a variety of circumstances.

Returning again to FIG. 2, determination unit 205 is a unit that compares a value of amplitude measured by amplitude measurement unit 203 and upper and lower limits stored in memory 204, to determine whether the value of amplitude is between the upper limit and the lower limit. If the value of amplitude is within the range, determination unit 205 sends a notification instruction signal to notification unit 206, which is a signal for activating notification unit 206. On the other hand, if the value of amplitude is outside the range, determination unit 205 does not send a notification instruction signal to notification unit 205.

Notification unit 206 is a unit that sends, in response to a notification instruction signal sent from determination unit 205, a signal to an external device for instructing the device to operate. Alternatively, notification unit 206 may be a lamp that lights up in response to a notification instruction signal, or a buzzer that sounds in response to a notification instruction signal.

Now, an example of an operation performed by sensor 100 and transceiver 200 will be described. The example described below relates to an operation of a case where sensor 100 is used as a switch of an automatic door.

Figure 3:
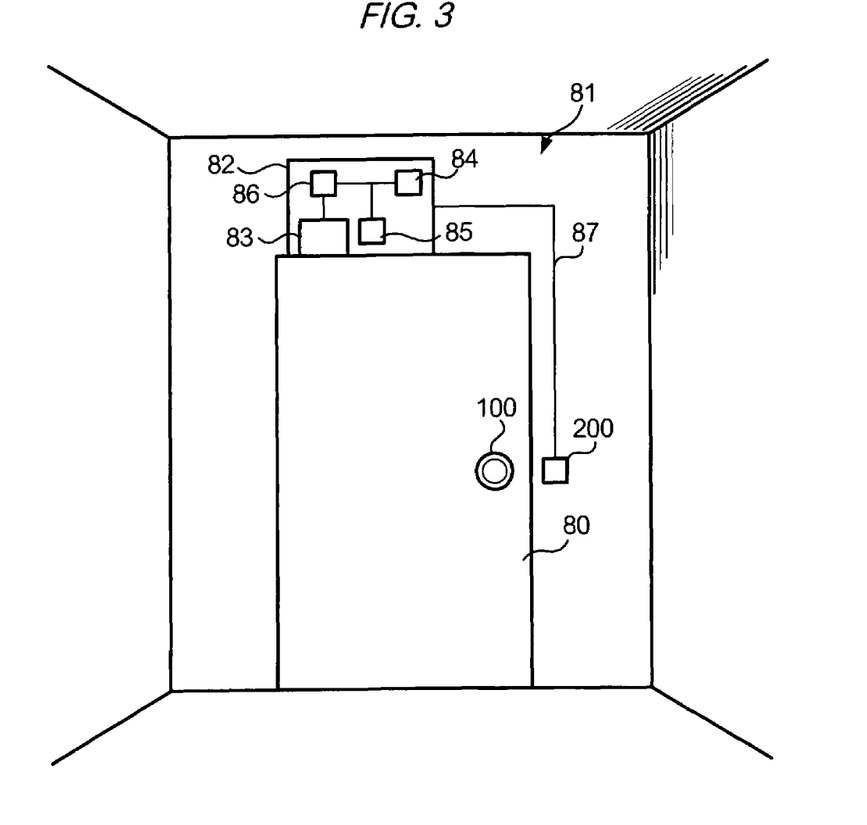
FIG. 3 is a diagram illustrating a configuration of an automatic door system.

FIG. 3 is a diagram illustrating a configuration of an automatic door system where sensor 100 is used as a switch of an automatic door. In the example shown in the drawing, sensor 100 is attached to door 80, and transceiver 200 is attached to wall 81. The position of transceiver 200 is arranged so that transceiver 200 is able to exchange radio signals with sensor 100. Sensor 100 may be attached to an area of wall 81 near door 80.

Sensor 100 is attached to door 80 so that a side of sensor 100 where reference electrode 106 is formed, or the under surface of sensor 100 shown in FIG. 1C, is exposed, to determine whether a human body is in contact with reference electrode 106. On the other hand, the upper surface of sensor 100 shown in FIG. 1A is covered with a resin case, and a surface of the resin case is attached to door 80.

Drive unit 82 includes motor 83 for opening and closing door 80, receiver 84 for receiving a signal from outside, sensor 85 for detecting an object near door 80 by infrared light or ultrasound, and controller 86 for controlling rotation of motor 83. Receiver 84 of drive unit 82 is connected to notification unit 206 of transceiver 200 via signal line 87.

Figure 4:
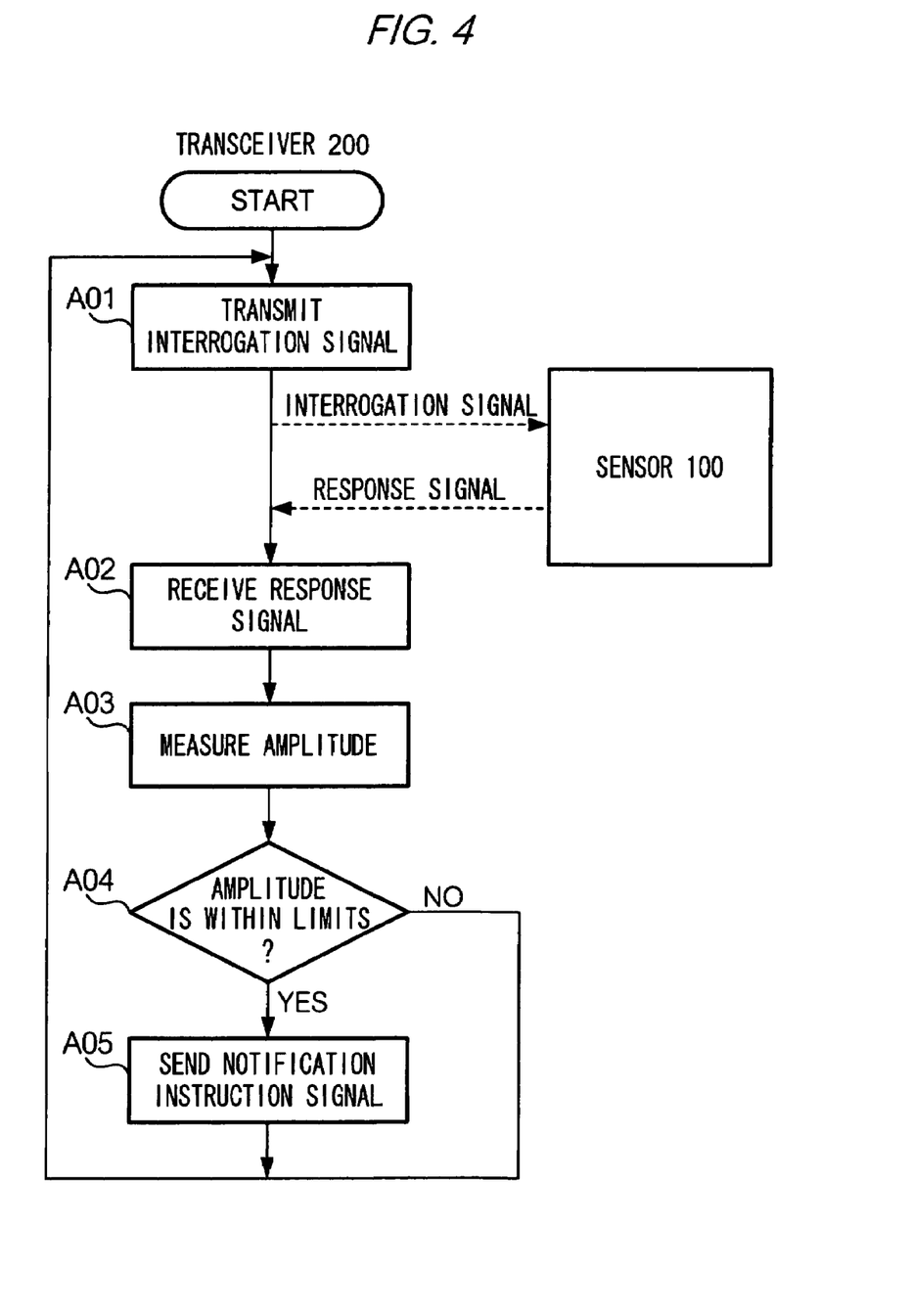
FIG. 4 is a flowchart illustrating an operation of transceiver 200.

Now, an operation of transceiver 200 will be described with reference to a flowchart shown in FIG. 4. In the following description it is assumed that door 80 is closed at START of the flowchart.

At step A01, signal processor 202 of transceiver 200 generates an electrical signal having a certain frequency and amplitude, and provides the electrical signal to antenna 201. Antenna 201 converts the electrical signal into a radio signal, and transmits the radio signal as an interrogation signal.

When the interrogation signal is received by antenna 104 of sensor 100, antenna 104 converts the interrogation signal into an electrical signal, and provides the electrical signal to IDT 103. IDT 103 converts the electrical signal into a surface acoustic wave, which propagates on piezoelectric substance 102 toward reflector 107. When the surface acoustic wave reaches reflector 107, reflector 107 throws back the surface acoustic wave toward IDT 103. When the reflected surface acoustic wave reaches IDT 103, IDT 103 converts the surface acoustic wave into an electrical signal, and provides the electrical signal to antenna 104. Antenna 104 converts the electrical signal into a radio signal, and transmits the radio signal as a response signal.

At step A02, when the response signal is received by antenna 201 of transceiver 200, antenna 201 converts the response signal into an electrical signal, and provides the electrical signal to amplitude measurement unit 203 via signal processor 202.

At step A03, amplitude measurement unit 203 measures amplitude of the electrical signal provided from antenna 201.

At step A04, determination unit 205 compares the value of amplitude measured by amplitude measurement unit 203 and upper and lower limits stored in memory 204, to determine whether the value of amplitude is between the upper limit and the lower limit. If the value of amplitude is within the range, namely if electrode 106 of sensor 100 touches a human body (step A04: YES), the operation of transceiver 200 proceeds to step A05. On the other hand, if the value of amplitude is outside the range, namely if electrode 106 of sensor 100 does not touch a human body (step A04: NO), the operation returns to step A01.

At step A05, determination unit 205 sends a notification instruction signal to notification unit 206. In response to the notification instruction signal, notification unit 206 generates a signal for instructing controller 86 of drive unit 82 to drive motor 83 (drive instruction signal), and sends the drive instruction signal to drive unit 82 via signal line 87.

When receiver 84 of drive unit 82 receives the drive instruction signal sent by notification unit 206 of transceiver 200, controller 86 causes motor 83 to rotate to open door 80. Once door 80 is opened, sensor 85 starts monitoring of an object passing through door 80. Subsequently, when a predetermined time has passed after no object is detected, controller 86 causes motor 83 to rotate to close door 80.

Transceiver 200 repeats the operation from step A01 to step A04 or 05 at certain intervals, and thereby monitors whether a human body is in contact with sensor 100, and if a human body is in contact with sensor 100, opens door 80.

The foregoing is an example of an operation performed by sensor 100 and transceiver 200.

(2) Second Exemplary Embodiment

Figure 5A:
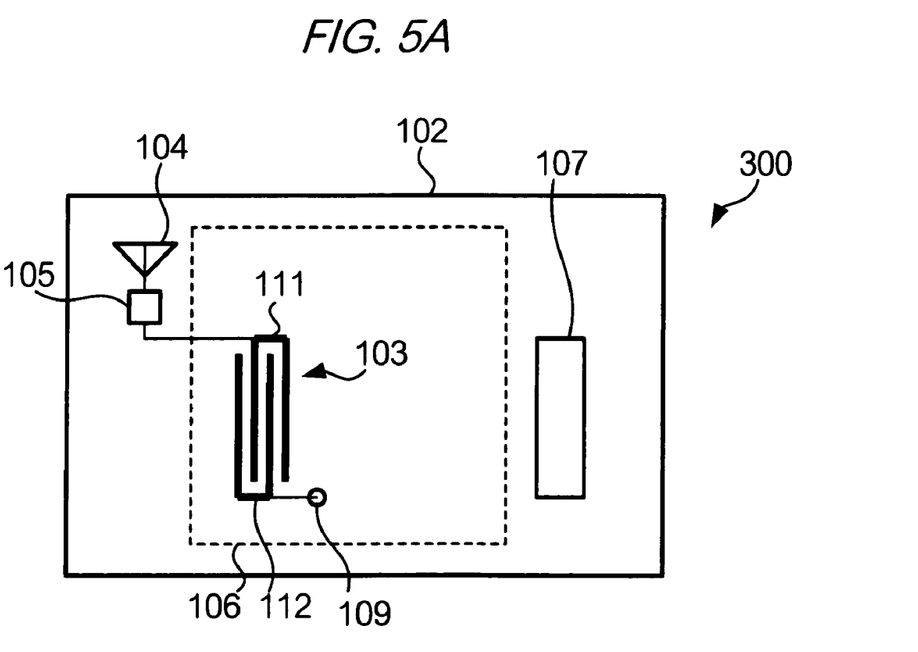
FIGS. 5A and 5B are diagrams illustrating a configuration of sensor 300.
Figure 5B:
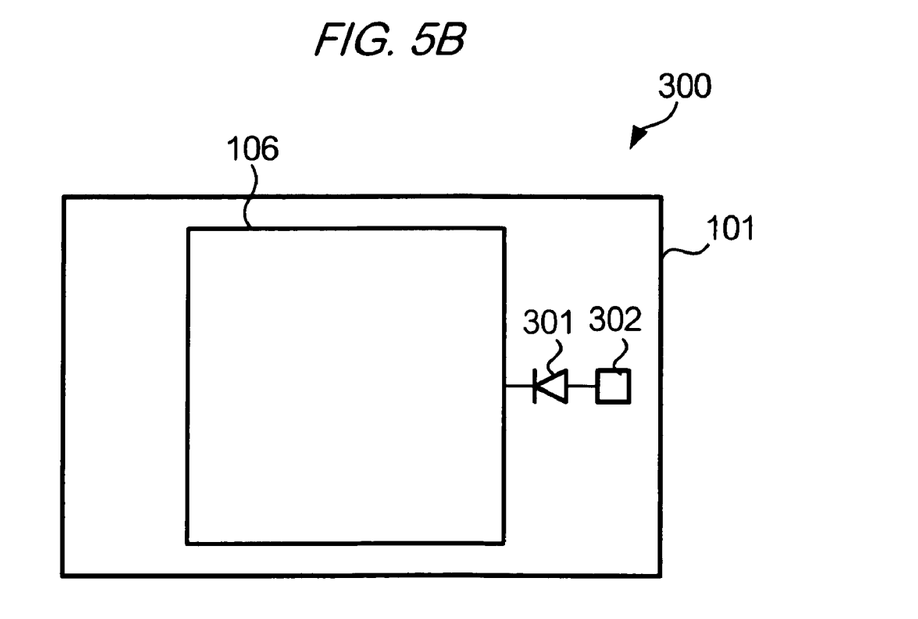

FIG. 5A is a plan view of sensor 300 according to the present exemplary embodiment. FIG. 5B is a plan view illustrating the other side of sensor 300. In the drawings, elements shared with the first exemplary embodiment are denoted by like numerals. Sensor 300 exchanges radio signals with transceiver 200, configuration of which is shown in FIG. 2.

Sensor 300 according to the present exemplary embodiment is different from sensor 100 according to the first exemplary embodiment in that reference electrode 106 is connected to photodiode 301, and photodiode 301 is further connected to electrode 302 on the other side of sensor 300. It is to be noted that photodiode 301 may be arranged in a direction opposite to that of the example shown in FIG. 5B.

Photodiode 301 generates electromotive force in response to light, and the electromotive force causes a potential difference between reference 106 and electrode 302. At this point, if photodiode 301 is arranged as shown in FIG. 5B, a potential of reference electrode 106 becomes higher than that of electrode 302, and consequently, a potential of second electrodes 112 rises to a corresponding value different from that of a case where photodiode 301 is not irradiated.

In the situation, if an interrogation signal sent from transceiver 200 is received by sensor 300, amplitude of a response signal sent from sensor 300 is smaller than that of a case where photodiode 301 is not irradiated. Accordingly, transceiver 200 can determine on the basis of amplitude of a response signal whether sensor 300 is irradiated.

To make the determination, memory 204 of transceiver 200, as in the case of the first exemplary embodiment, stores an upper limit and a lower limit of amplitude of a response signal sent from sensor 300 when photodiode 301 of the sensor is irradiated. Accordingly, if a response signal is sent from sensor 300 when irradiated, a value of the amplitude of the response signal would be between the upper limit and the lower limit, and determination unit 205 of transceiver 200 sends a notification instruction signal to notification unit 206. On receipt of the notification instruction signal, notification unit 206 sends a signal to an external device for instructing the device to operate.

(3) Modifications

The above exemplary embodiments may be modified as described below.

(3-1) First Modification

Sensor 100 according to the first exemplary embodiment may be used to detect a contact with an object other than a human body, as described below.

Figure 6:
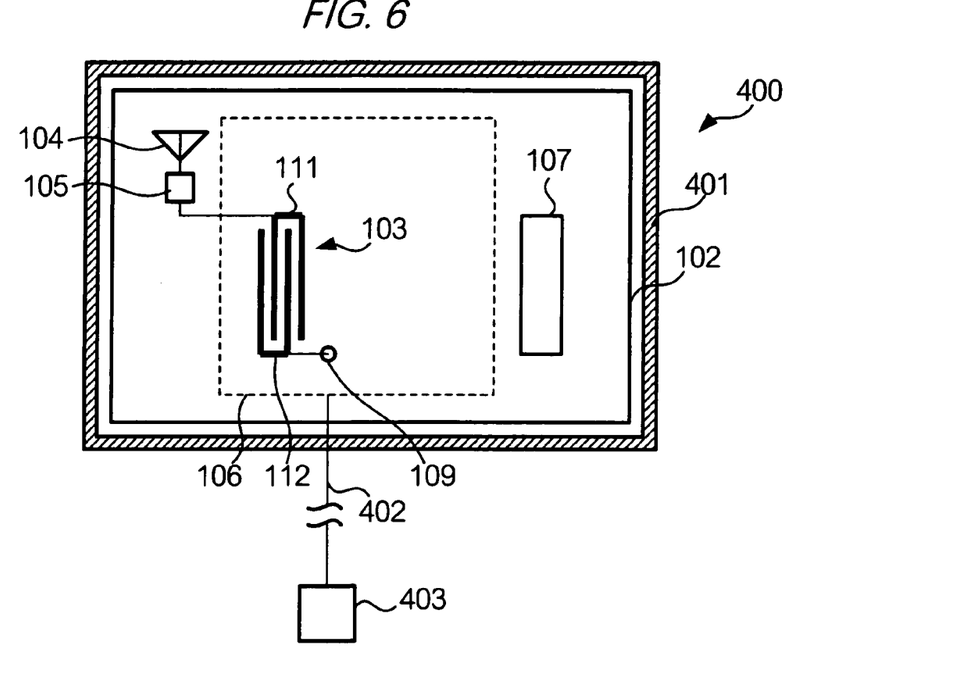
FIG. 6 is a diagram illustrating a configuration of sensor 400.

FIG. 6 is a diagram illustrating a configuration of sensor 400 according to the present modification. Specifically, FIG. 6 is a diagram illustrating a configuration of sensor 100 housed in case 401. In the drawing, elements identical to those of the first exemplary embodiment are denoted by like numerals. Sensor 400 includes sensor 100 according to the first exemplary embodiment and case 401 housing sensor 100. Reference electrode 106 of sensor 100 is connected to one end of line 402 that extends to the outside of case 401, and the other end of line 402 is connected to electrode 403. Line 402 is coated with a resin such as a vinyl to prevent line 402 from coming into contact with water. Case 401 is sealed to prevent water from seeping in.

Figure 7:
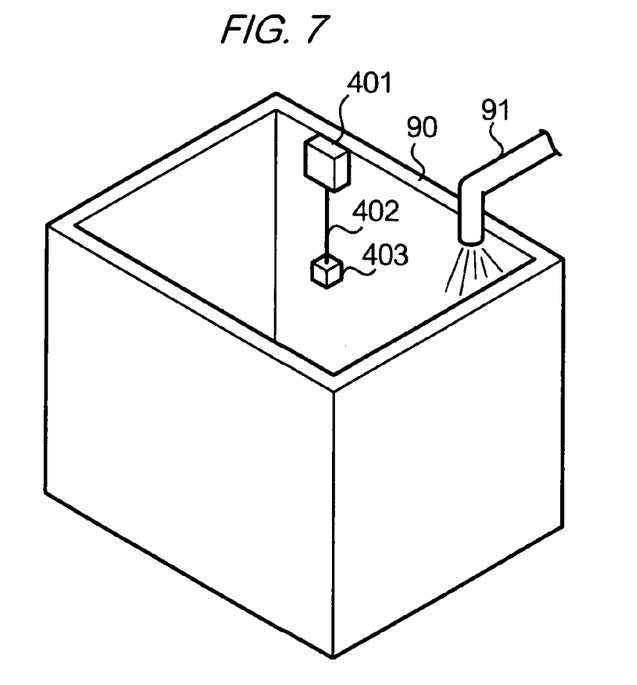
FIG. 7 is a diagram illustrating sensor 400 attached to tank 90.

FIG. 7 is a diagram illustrating sensor 400 attached to tank 90. As shown in the drawing, case 401 of sensor 400 is attached to an upper edge of tank 90, line 402 extending from case 401 is laid toward the bottom of tank 90, and electrode 403 connected to line 402 is attached to an inside wall of tank 90. Electrode 403 is located at a level of water to be stored in tank 90.

When water is poured from water outlet 91 into tank 90, and water, which is a conductor, comes into contact with electrode 403, impedance of reference electrode 106 (a reference surface of potential) changes, as in the first exemplary embodiment. As a result, a reference potential defined by the reference surface of potential changes, and therefore a value of amplitude of a response signal, which is transmitted from sensor 400 in response to an interrogation signal from transceiver 200, becomes a certain value.

Transceiver 200 according to the present modification is located so that transceiver 200 is able to exchange radio signals with sensor 400, as in the first embodiment. Memory 204 of transceiver 200 pre-stores an upper limit and a lower limit of amplitude of a response signal transmitted from sensor 400 when electrode 403 is in contact with water. Notification unit 206 of transceiver 200 according to the present modification is a buzzer that sounds in response to a notification instruction signal.

(3-2) Second Modification

In the second exemplary embodiment, where photodiode 301 is used as an impedance converter of a reference surface of potential, other elements such as a thermistor, a thermocouple, or a strain gauge may be used as an impedance converter. If a thermistor or a thermocouple, which is able to change a potential of reference electrode 106 in response to a temperature change, is connected between reference electrode 106 and electrode 302, sensor 300 may be used as a temperature sensor. Alternatively, if a strain gauge is connected between reference electrode 106 and electrode 302, sensor 300 may be used as a strain sensor.

(3-3) Third Modification

Figure 8:
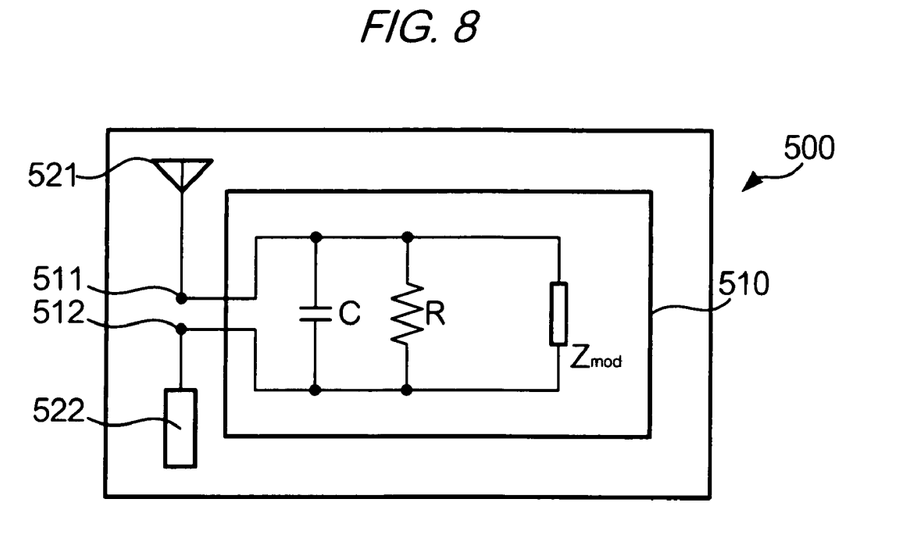
FIG. 8 is a diagram illustrating an equivalent circuit of RFID tag 500.

FIG. 8 is a diagram illustrating an equivalent circuit of RFID (Radio Frequency Identification) tag 500 according to the present modification. As shown in the drawing, RFID tag 500 includes IC (Integrated Circuit) chip 510 storing an ID for identifying RFID tag 500 uniquely. One terminal 511 of IC chip 510 is connected to antenna element 521, and the other terminal 512 is connected to impedance converter 522. Antenna element 521 serves as an unbalanced feed antenna.

When antenna element 521 of RFID tag 500 receives a radio signal from outside, an electrical signal representing an ID stored in IC chip 510 is output to antenna element 521 via terminal 511. During the process, amplitude of an electrical signal changes according to impedance of impedance converter 522.

Impedance converter 522 connected to terminal 512 may be reference electrode 106, as in the case of the first exemplary embodiment, or a combination of photodiode 301 and electrode 302, as in the case of the second exemplary embodiment. Alternatively, impedance converter 522 may be a thermistor, a thermocouple, or a strain gauge.

As is illustrated by the foregoing explanation, the present invention is applicable to a sensor other than a SAW sensor, as long as the sensor has a reference surface for potential.

(3-4) Fourth Modification

Figure 9:
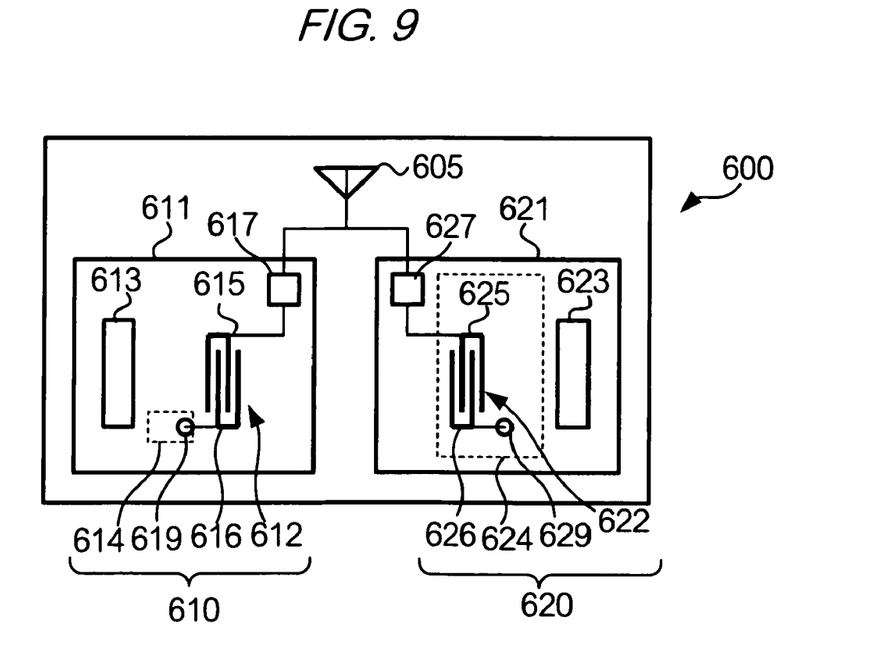
FIG. 9 is a diagram illustrating a configuration of sensor 600.

FIG. 9 is a diagram illustrating a configuration of sensor 600 according to the present modification that is a combination of two SAW sensors. As shown in the drawing, sensor 600 includes antenna 105, first sensor 610, and second sensor 620.

First sensor 610 includes substrate 611, IDT 612, reflector 613, impedance converter 614, and impedance matching circuit 617. A piezoelectric substance is deposited on a surface of substrate 611, shown in FIG. 9. IDT 612 and reflector 613 are deposited on the piezoelectric substance. A configuration of IDT 612 is the same as that of IDT 103 according to the first exemplary embodiment, and a configuration of reflector 613 is the same as that of reflector 107 according to the first exemplary embodiment. Electrode 615 of IDT 612 is connected to antenna 605 via impedance matching circuit 617, whereas electrode 616 is connected to impedance converter 614 via through-hole 619.

Second sensor 620 includes substrate 621, IDT 622, reflector 623, reference electrode 624, and impedance matching circuit 627. A piezoelectric substance is deposited on a surface of substrate 621, shown in FIG. 9. IDT 622 and reflector 623 are deposited on the piezoelectric substance. A configuration of IDT 622 is the same as that of IDT 103 according to the first exemplary embodiment, and a configuration of reflector 623 is the same as that of reflector 107 according to the first exemplary embodiment. Electrode 625 of IDT 622 is connected to antenna 605 via impedance matching circuit 627, whereas electrode 626 is connected to reference electrode 624 via through-hole 629.

Substrate 611 of first sensor 610 and substrate 621 of second sensor 620 are arranged separately from each other on a substrate.

First sensor 610 functions as a sensor for detecting a contact with an object or a change in the environment. To do so, impedance converter 614 of first sensor 610 may be reference electrode 106, as in the case of the first exemplary embodiment, or a combination of reference electrode 106, photodiode 301, and electrode 302, as in the case of the second exemplary embodiment. Alternatively, impedance converter 522 may be a thermistor, a thermocouple, or a strain gauge.

On the other hand, second sensor 620 functions as a device for sending a radio signal representing an ID of sensor 600, as a commonly used SAW sensor does.

The distance between an IDT and a reflector of each of first and second sensors 610 and 620 is different. Consequently, a propagation time of a surface acoustic wave is differentiated between first sensor 610 and second sensor 620. Accordingly, transceiver 200 can differentiate, from a response time, a response signal of first sensor 610 from a response signal of second sensor 620.

(3-5) Fifth Modification

Figure 10:
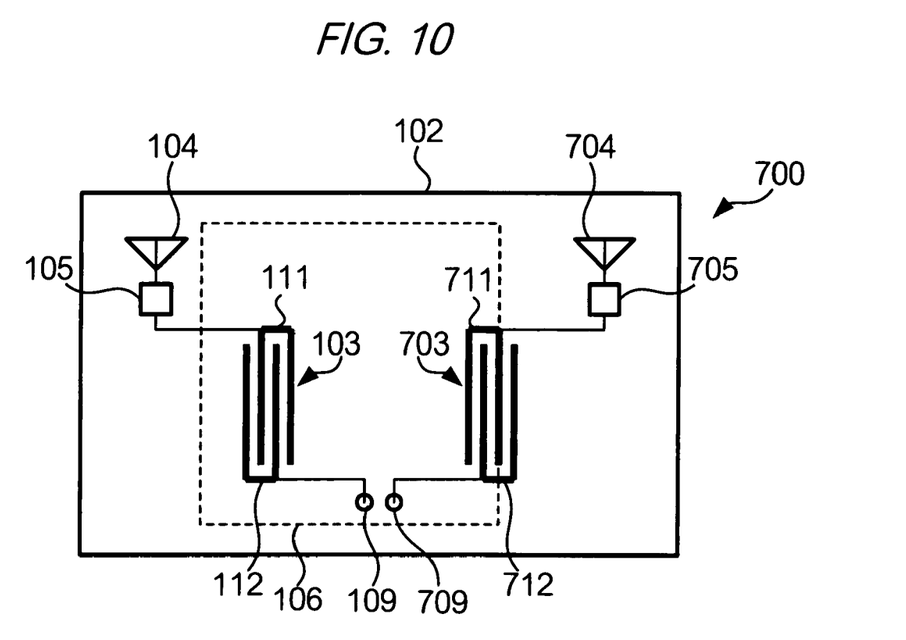
FIG. 10 is a diagram illustrating a configuration of sensor 700.

In the first exemplary embodiment, reflector 107 of sensor 100 may be replaced with an IDT. FIG. 10 is a diagram illustrating a configuration of sensor 700 where an IDT is used instead of a reflector. In the drawing, elements shared with the first exemplary embodiment are denoted by like numerals.

As shown in FIG. 10, sensor 700 has a surface of piezoelectric substance 102, on which IDTs 103 and 703, antennas 104 and 705, and impedance matching circuits 105 and 705 are disposed. IDT 703 is arranged so that it faces IDT 103. Electrode 711 of IDT 703 is connected to antenna 704, and electrode 712 of IDT 703 is connected to reference electrode 106 via through-hole 709.

In sensor 700 having the above configuration, when a surface acoustic wave excited by IDT 103 propagates on piezoelectric substance 102 and reaches IDT 703, IDT 703 converts the surface acoustic wave into an electrical signal. During the process, if impedance of reference electrode 106 changes, potentials of second electrodes 112 and 712 changes to a certain different value, and consequently amplitude of a response signal sent from antenna 704 changes accordingly. Namely, sensor 700 of the present exemplary embodiment functions the same way as sensor 100 of the first exemplary embodiment does.

It is to be noted that a reflector of the second exemplary embodiment or other modifications may be replaced with an IDT.

(3-6) Sixth Modification

Figure 11:
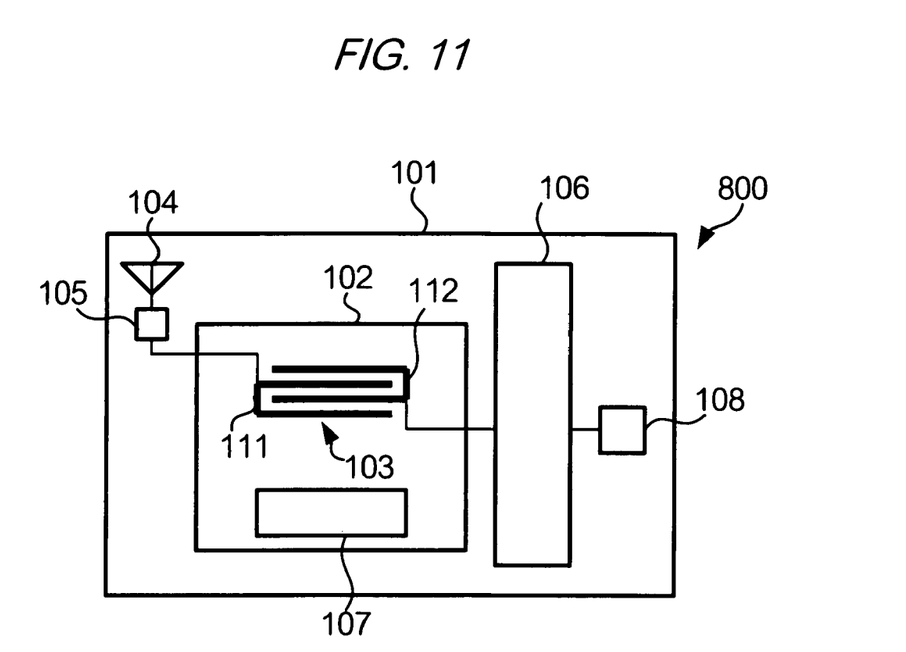
FIG. 11 is a diagram illustrating a configuration of sensor 800.

In the above exemplary embodiments and other modifications, where a reference electrode is formed on the under surface of a substrate of a sensor, a reference electrode may be deposited on the upper side of a substrate, as in the case of sensor 800 shown in FIG. 11. In the drawing, elements shared with the first exemplary embodiment are denoted by like numerals, and 108 denotes an impedance converter.

The foregoing description of the exemplary embodiments of the present invention has been provided for the purposes of illustration and description. It is not intended to be exhaustive or to limit the invention to the precise forms disclosed. Obviously, many modifications and variations will be apparent to practitioners skilled in the art. The exemplary embodiments were chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A sensor comprising:
   a substrate;
   a medium deposited on the substrate and on which a surface acoustic wave propagates;
   a reference electrode deposited on the substrate, that serves as a reference surface of potential;
   an antenna that receives and transmits a signal;
   a transducer deposited on the medium, that comprises a first electrode connected to the antenna and a second electrode connected to the reference electrode and arranged opposite to the first electrode, and that has a function of converting a signal received by the antenna into a surface acoustic wave propagating on the medium, and a function of converting a surface acoustic wave propagating on the medium and reaching the transducer into a signal and outputting the signal to the antenna;
   a reflector that throws back a surface acoustic wave generated by the transducer, propagating on the medium, and reaching the reflector, toward the transducer; and
   an impedance converter connected to the reference electrode, impedance of which changes in response to a change in circumstances surrounding the sensor.

2. The sensor according to claim 1, wherein impedance of the impedance converter changes in response to light.

3. The sensor according to claim 1, wherein impedance of the impedance converter changes in response to a change in temperature.

4. A sensor comprising:
   a substrate:
   a medium deposited on the substrate and on which a surface acoustic wave propagates;
   a reference electrode deposited on the surface, that serves as a reference surface of potential;
   a first antenna that receives a signal;
   a second antenna that sends a signal;
   a first transducer deposited on the medium, that comprises a first electrode connected to the first antenna and a second electrode connected to the reference electrode and arranged opposite to the first electrode, and that converts a signal received by the first antenna into a surface acoustic wave propagating on the medium;
   a second transducer deposited on the medium, that comprises a third electrode connected to the second antenna and a fourth electrode connected to the reference electrode and arranged opposite to the third electrode, and that converts a surface acoustic wave excited by the first transducer, propagating on the medium and reaching the second transducer, into a signal, and outputs the signal to the second antenna; and
   an impedance converter connected to the reference electrode, impedance of which changes in response to a change in circumstances surrounding the sensor.

5. The sensor according to claim 4, wherein impedance of the impedance converter changes in response to light.

6. The sensor according to claim 4, wherein impedance of the impedance converter changes in response to a change in temperature.

7. A sensor comprising:
   a base means;
   a wave transmission means deposited on the base means and on which a surface acoustic wave propagates;
   a first electrical connecting means deposited on the bases means, that serves as a reference surface of potential;
   a signal transmitting/receiving means for receiving and transmitting a signal;
   an energy converting means deposited on the wave transmission means, that comprises a second electrical connecting means connected to the signal transmitting/receiving means and a third electrical connecting means connected to the first electrical connecting means and arranged opposite to the second electrical connecting means, and that has a function of converting a signal received by the signal transmitting/receiving means into a surface acoustic wave propagating on the wave transmission means, and a function of converting a surface acoustic wave propagating on wave transmission means and reaching the energy converting means into a signal and outputting the signal to the signal transmitting/receiving means;
   a reflecting means for throwing back a surface acoustic wave generated by the energy converting means, propagating on the wave transmission means, and reaching the reflecting means, toward the energy converting means; and
   an impedance converting means connected to the first electrical connecting means, impedance of which changes in response to a change in circumstances surrounding the sensor.

* * * * *